US006724456B2

(12) United States Patent
Kamiya

(10) Patent No.: US 6,724,456 B2
(45) Date of Patent: Apr. 20, 2004

(54) LIQUID CRYSTAL DISPLAY DEVICE

(75) Inventor: Kiyoshi Kamiya, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 197 days.

(21) Appl. No.: 10/100,036

(22) Filed: Mar. 19, 2002

(65) Prior Publication Data

US 2002/0154263 A1 Oct. 24, 2002

(30) Foreign Application Priority Data

Mar. 22, 2001 (JP) ........................................ 2001-081985
Feb. 8, 2002 (JP) ........................................ 2002-031638

(51) Int. Cl.[7] .......................................... G02F 1/1345
(52) U.S. Cl. ...................................... 349/149; 349/151
(58) Field of Search ................................ 349/149, 150, 349/151, 152, 153, 142, 145

(56) References Cited

U.S. PATENT DOCUMENTS

| 5,748,267 A | * | 5/1998 | Natori et al. ................. 349/40 |
| 6,151,091 A | * | 11/2000 | Muramatsu .................. 349/149 |
| 6,163,357 A | * | 12/2000 | Nakamura ................... 349/155 |
| 6,388,339 B1 | * | 5/2002 | Yamamoto et al. ......... 257/787 |
| 6,414,733 B1 | * | 7/2002 | Ishikawa et al. ............ 349/110 |
| 6,621,547 B2 | * | 9/2003 | Kang .......................... 349/151 |
| 6,636,288 B2 | * | 10/2003 | Kim et al. ................... 349/139 |

FOREIGN PATENT DOCUMENTS

| JP | 5-289096 | 11/1993 |
| JP | 7-270811 | 10/1995 |
| JP | 9-311341 | 12/1997 |
| JP | 11-288001 | 10/1999 |

* cited by examiner

Primary Examiner—Tarifur R. Chowdhury
Assistant Examiner—David Chung
(74) Attorney, Agent, or Firm—Westerman, Hattori, Daniels & Adrian LLP

(57) ABSTRACT

A liquid crystal display device has a liquid crystal layer (20) sandwiched between an upper substrate (1) having scanning electrodes (11) and a lower substrate (5) having opposite electrodes (13) and electrode driving ICs (2, 3, 4), mounted only at a side of the upper substrate (1), for driving the respective electrodes, in which connecting wirings (10) for connecting the scanning electrode driving ICs (3, 4) and the scanning electrodes (11) are disposed between an image display portion (14), which is provided on the inner side of a sealing portion (15) for bonding the substrates (1, 5) together, and the sealing portion (15). The connecting wirings (10) and the scanning electrodes (11) are electrically connected to each other at connecting regions (12) provided in the sealing portion (15), and a shielding (51) is provided between the image display portion (14) and the sealing portion (15).

14 Claims, 12 Drawing Sheets

F I G. 1 4
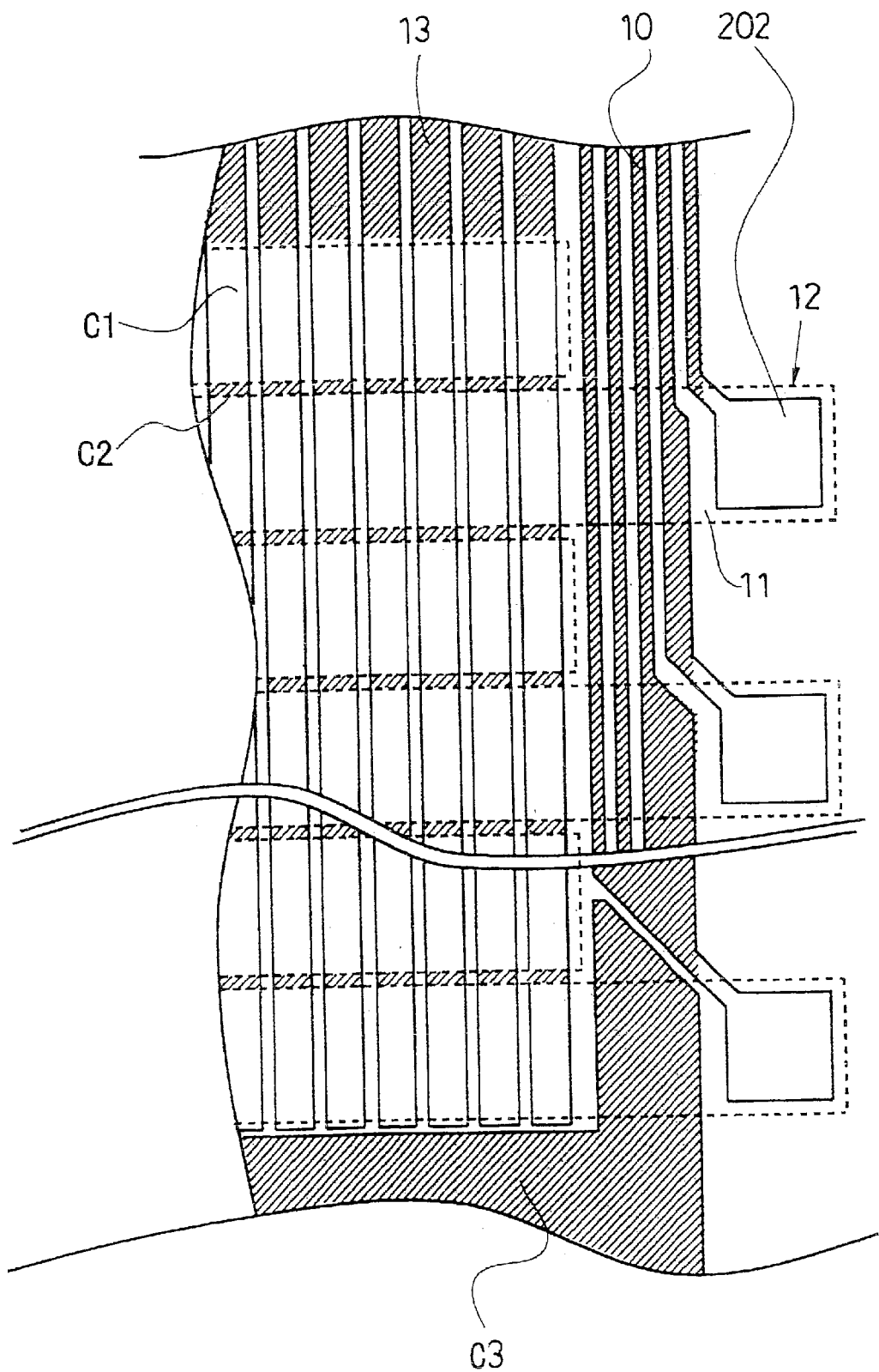

← A

LIQUID CRYSTAL DISPLAY DEVICE

BACKGROUND OF THE INVENTION

1. Field of the Invention

The invention relates to a liquid crystal display device characterized in a structure of connection between electrode driving ICs mounted on substrates and electrodes such as scanning electrodes, signal electrodes, and the like which are provided on the substrates.

2. Description of the Related Art

Super twisted nematic (STN) liquid crystal display devices are employed most widely for small display units such as cellular phones and the like. Since a decrease in size of an outer case and an increase in size of an image display portion are simultaneously demanded in a cellular phone in particular, it is necessary to devise the structure of the liquid crystal display device and the arrangement of electrode driving ICs. Recently, the number of pixels increases to perform display in colors and gradations as well, and thus a small liquid crystal panel for a cellular phone is offered, in which a scanning electrode driving IC and a signal electrode driving IC are arranged on two sides respectively similarly to the arrangement of the electrode driving ICs in a large liquid crystal panel. Such a structure, however, is not desired in terms of design because of broken symmetry of the liquid crystal panel.

Therefore, a configuration using a one-chip electrode driving IC in which a scanning electrode driving circuit, a signal electrode driving circuit, an image memory, and a display control circuit are formed in one electrode driving IC, or a configuration in which all the driving circuits are mounted on one side of one substrate, is begun to be used.

An arrangement of members and a wiring state in a conventional liquid crystal display device using a one-chip electrode driving IC are explained here using FIG. 18 to FIG. 21. FIG. 18 is a plan view of the liquid crystal display device, FIG. 19 is a side view of the same as viewed from a direction of an arrow A in FIG. 18, FIG. 20 is a plan view showing an arrangement of electrodes in the liquid crystal display device, and FIG. 21 is a view for explaining an arrangement of connecting wirings connected to scanning electrodes in the liquid crystal display device. In these drawings, the illustration of optical members such as a polarizer, a reflector and the like is omitted.

In this liquid crystal display device, an electrode driving IC 62 is mounted on an upper substrate 61 which is made of glass. A method, in which the electrode driving IC is mounted on the substrate as described above, is often employed. (It is called chip-on-board. With a glass substrate, it is called chip-on-glass and hereinafter referred to as COG.) As shown in FIG. 18 and FIG. 19, the electrode driving IC 62, a lower substrate 63 which is made of glass, and a connecting film circuit (called a flexible printed circuit, and hereinafter referred to as an FPC) 64 are adhered to a back face of the upper substrate 61. Among them, the upper substrate 61 and the lower substrate 63 are adhered to each other with a sealing portion 69 and hold a liquid crystal layer sandwiched therebetween.

On these substrates, electrodes are formed on respective faces on the liquid crystal layer sides. In FIG. 20, solid lines show the electrodes formed on (the back face of) the upper substrate 61, and phantom lines show the electrodes formed on the lower substrate 63. Broken lines represent repetition of respective components.

As shown in FIG. 20, scanning electrodes 65 are formed of ITO (indium tin oxide) on the lower substrate 63. Further, signal electrodes 66, wirings 68 for connecting them to the FPC 64, and connecting wirings 67 for connecting the scanning electrodes 65 and electrode driving terminals of the electrode driving IC 62 are formed of ITO on the back face of the upper substrate 61. Then portions where the scanning electrodes 65 and the signal electrodes 66 overlap (oppose) each other in a plan view become individual pixels, and a region where these pixels perform effective display based on image data becomes an image display portion 612 shown by the phantom line.

A face with terminals of the electrode driving IC 62 and the connecting wirings on the upper substrate 61 are electrically connected to each other with an anisotropic conductive film (hereinafter, referred to as an ACF) sandwiched therebetween. Similarly, not shown wirings on the FPC 64 and the wirings 68 on the upper substrate 61 are also connected to each other by an ACF within connecting regions 611.

FIG. 21 shows only members associated with the connection between the scanning electrodes 65 and the electrode driving IC 62. As shown in this drawing, the scanning electrodes 65 and the connecting wirings 67 are connected to each other through the sealing portion 69 at connecting regions 610. The sealing portion 69, in which conductive particles are mixed here, is an anisotropic conductive sealing portion which makes conduction only in a direction perpendicular to the substrates 61 and 63.

Assuming that the place where the electrode driving IC 62 is mounted is the upper side of the image display portion 612, the scanning electrode driving terminals on the left-hand side of the electrode driving IC 62 are connected to the scanning electrodes 65 arranged at the upper half of the image display portion 612, and the scanning electrode driving terminals on the right-hand side are connected to the scanning electrodes 65 arranged at the lower half of the image display portion 612.

Further, the connecting wirings 67 for the scanning electrode driving terminals extending from the lower side of the electrode driving IC 62 in FIG. 21 are connected to the scanning electrodes 65 in the connecting regions 610 which are arranged at the upper side of the sealing portion 69. The connecting wirings 67 extending from the upper side thereof are connected to the scanning electrodes 65 in the connecting regions 610 which are arranged at the left-hand side (or the right-hand side) of the sealing portion 69.

In the case of a small number of display digits provided as in an early-type liquid crystal display panel for a cellular phone, the connecting wirings 67 provided only at the upper side of the image display portion 612 enabled connection between the electrode driving IC 62 and the scanning electrodes 65. In the case of a large number of display digits, however, sufficient region for connection can not be obtained if wirings are drawn only from the upper side of the image display portion, because the pitch of the connecting regions 610 needs to be made larger than the pitch of the connecting wirings 67. Accordingly, as shown in FIG. 19 and FIG. 20, the connecting wirings 67 need to be routed from the left- and right-hand sides of the image display portion 612.

In the liquid crystal display device for a cellular phone, the demand is always to decrease the size of a glass external shape as described above. On the other hand, an increase in display information volume and an increase in the number of scanning electrodes of the liquid crystal display device require widening a region for the connecting wirings, resulting in increased glass external shape. Further, a pair of substrates are bonded together with a sealing material, in which a problem is caused from situation wherein a disregard for the positional relationship between a sealing portion where the sealing material is provided and the region for the connecting wirings might cause a decrease in productivity and display quality.

In other words, when fabricating a liquid crystal display device, a method is used which bonds a pair of large substrates together and cuts out a plurality of liquid crystal display devices therefrom, in which if the connecting wirings are provided outside the sealing portion, the cutting for cutting out the liquid crystal display devices is performed near the connecting wirings. This possibly exerts adverse effects on the connecting wirings such as break lines due to cracks of substrates and foreign substances appearing in the cut portion.

Hence, it is an object of this invention to solve these problems and to realize a small and reliable liquid crystal display device securing a sufficient display information volume. Further, it is another object of this invention to realize a liquid crystal display device having a low cost and an excellent display quality.

SUMMARY OF THE INVENTION

To achieve the above objects, this invention is a liquid crystal display device having a liquid crystal layer sandwiched between a pair of substrates each provided with electrodes and an electrode driving IC, mounted only at one side of either one of the pair of substrates, for driving the respective electrodes on the pair of substrates, comprising: a sealing portion for bonding the pair of substrates together; and connecting wirings for connecting the electrode driving IC and the electrodes on other substrate, wherein the connecting wirings are arranged between an image display portion provided on an inner side of the sealing portion and the sealing portion, the connecting wirings and the electrodes on the other substrate are electrically connected to each other at connecting regions provided in the sealing portion, and a shielding is provided between the image display portion and the sealing portion.

In such a liquid crystal display device, it is preferable that instead of providing the shielding, the electrode on the other substrate is formed to be thinner at a portion where the connecting wiring opposes the electrode, except the connecting region, than in the image display portion.

Further, it is preferable that the shielding is provided using a low-reflection metal, a black resin, or a member formed by printing.

Further, it is also adoptable that the liquid crystal display device further comprises a polarizer to perform a display using a polarization property of the polarizer, and instead of providing the shielding, the polarizer may be provided in a region other than a region between the image display portion and the sealing portion.

It is also adoptable that instead of providing the shielding, the connecting wiring is provided with a low-reflection chrome layer.

Further, this invention is a liquid crystal display device having a liquid crystal layer sandwiched between a pair of substrates each provided with electrodes, an electrode driving IC, mounted only at one side of either one of the pair of substrates, for driving the respective electrodes on the pair of substrates, and a reflection layer, comprising: a sealing portion for bonding the pair of substrates together; and connecting wirings for connecting the electrode driving IC and the electrodes on other substrate, wherein the connecting wirings are arranged between an image display portion provided on an inner side of the sealing portion and the sealing portion, the connecting wirings and the electrodes on the other substrate are electrically connected to each other at connecting regions provided in the sealing portion, and the reflection layer is provided in a region other than a region between the image display portion and the sealing portion.

Alternatively, this invention is a liquid crystal display device having a liquid crystal layer sandwiched between a pair of substrates each provided with electrodes and an electrode driving IC, mounted only at one side of either one of the pair of substrates, for driving the respective electrodes on the pair of substrates, comprising: a sealing portion for bonding the pair of substrates together; and connecting wirings for connecting the electrode driving IC and the electrodes on other substrate, wherein the connecting wirings are arranged in the sealing portion, and the connecting wirings and the electrodes on the other substrate are electrically connected to each other at connecting regions provided in the sealing portion.

In each of the above liquid crystal display devices, it is preferable that an external shape of the sealing portion matches an external shape of each side of the pair of substrates except the side where the electrode driving IC is provided.

Alternatively, it is preferable that the respective electrodes on the pair of substrates are signal electrodes and scanning electrodes, and the electrode driving IC comprises at least one signal electrode driving IC for driving the signal electrodes and at least one scanning electrode driving IC for driving the scanning electrodes.

Further, it is preferable that a plurality of the scanning electrode driving ICs are provided and arranged in a manner to put the signal electrode driving IC therebetween.

Further, it is preferable that the scanning electrode driving IC is driven by an oscillation power supply having a period in which a potential thereof changes with time.

Further, it is preferable that the plurality of scanning electrode driving ICs are consisted of two scanning electrode driving ICs, and scanning electrodes connected to one of the scanning electrode driving ICs and scanning electrodes connected to other scanning electrode driving IC are alternately arranged.

The above and other objects, features and advantages of the invention will be apparent from the following detailed description which is to be read in conjunction with the accompanying drawings.

BRIEF DESCRIPTION OF THE DRAWINGS

FIG. 14 is a view showing a configuration of the electrodes near the connecting portions between the scanning electrodes and the connecting wirings in a liquid crystal display device of a second modification of the embodiment of the invention;

DETAILED DESCRIPTION OF THE PREFERRED EMBODIMENT

First Embodiment: FIG. 1 to FIG. 11

First of all, an embodiment of a liquid crystal display device of the invention will be explained.

FIG. 1 to FIG. 4 are views, corresponding to FIG. 18 to FIG. 21 used in the explanation for the prior art, each showing a configuration of the liquid crystal display device.

Figure 1:
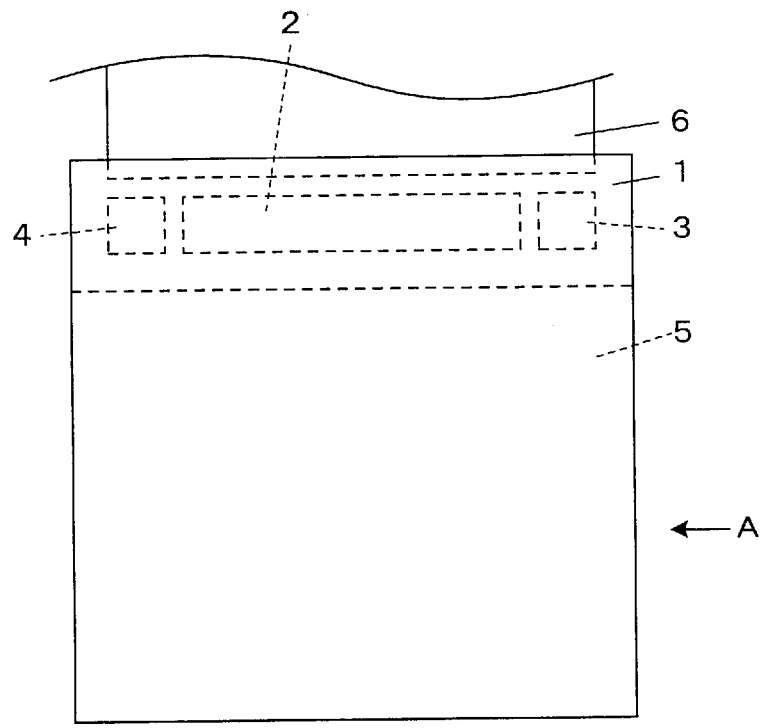
FIG. 1 is a plan view of a liquid crystal display device of an embodiment of the invention.
Figure 2:
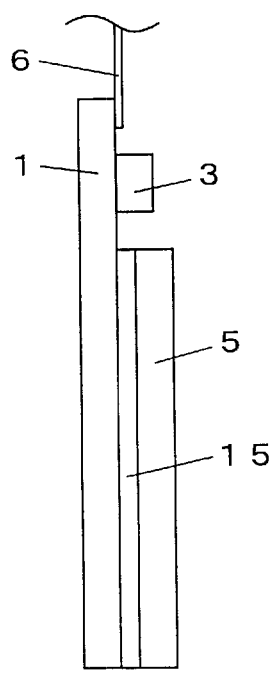
FIG. 2 is a side view thereof as viewed from a direction of an arrow A in FIG. 1.

As shown in FIG. 1, in this liquid crystal display device, on a back face of an upper substrate 1 which is made of glass, a signal electrode driving IC 2 and scanning electrode driving ICs 3 and 4 are mounted on the upper side by COG as electrode driving ICs tbr driving electrodes provided on the substrates, and further a lower substrate 5 made of glass and an FPC 6 are bonded to the back face. The ICs are arranged in such a manner that the left and right scanning electrode driving ICs 4 and 3 put the signal electrode driving IC 2 therebetween. Furthermore, the upper substrate 1 and the lower substrate 5 are bonded together with a sealing portion 15 and hold a liquid crystal lawyer sandwiched therebetween. The sealing portion 15 is an anisotropic conductive sealing portion which makes conduction only in a direction perpendicular to the substrates 1 and 5.

Figure 3:
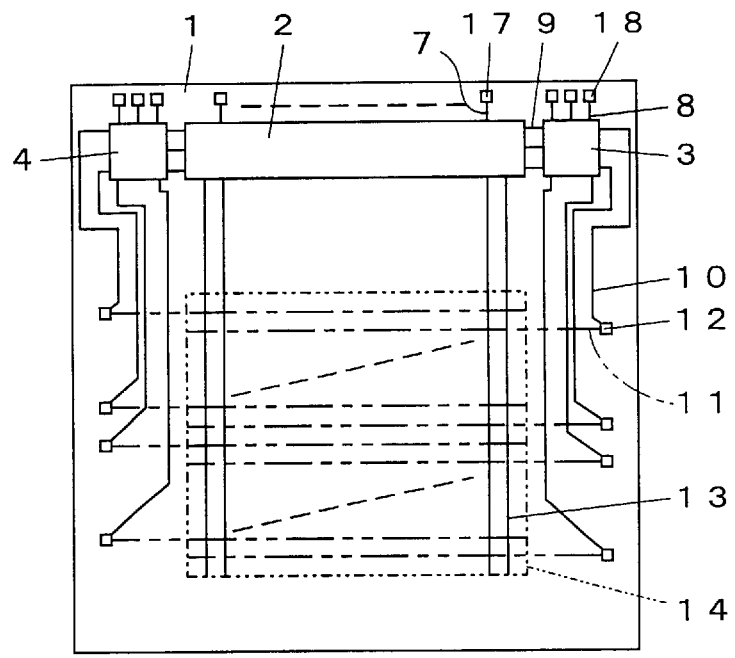
FIG. 3 is a plan view showing an arrangement of electrodes in the liquid crystal display device.

These substrates 1 and 5 have electrodes formed on faces on the liquid crystal layer sides respectively. In FIG. 3, solid lines show the electrodes formed on (the back face of) the upper substrate 1, and phantom lines show the electrodes formed on the lower substrate 5. Broken lines represent repetition of respective components.

As shown in FIG. 3, scanning electrodes 11 are formed on the lower substrate 5, and signal electrodes 13, wirings 7, 8 and 9, and connecting wirings 10 are formed on the upper substrate 1. Furthermore, portions where the scanning electrodes 11 and the signal electrodes 13 oppose each other become individual pixels, and a region where these pixels perform effective display based on image data becomes an image display portion 14 shown by the phantom line.

The wirings 7 are wirings for establishing connection between the signal electrode driving IC 2 and an external circuit, the wirings 8 are wirings for oscillation power supplies of the scanning electrode driving ICs 3 and 4, and the wirings 9 are wirings between the signal electrode driving IC 2 and the scanning electrode driving ICs 3 and 4. The connecting wirings 10 are connecting wirings for connecting scanning electrode driving terminals (not shown) of the scanning electrode driving ICs 3 and 4 and the scanning electrodes 11. These electrodes and wirings are formed of ITO. Further, on the upper end side of the upper substrate 1, connecting portions 17 and 18 of the wirings 7 and 8 with the FPC 6 are provided side by side.

It should be noted that three wirings 8 from the scanning electrode driving ICs 3 and 4 are shown in correspondence with later-described oscillation power supplies VDD, VCC and VSS. The wirings 9 are output signal lines from the signal electrode driving IC 2 to the scanning electrode driving ICs 3 and 4, and three lines indicate that these signal lines can be classified under three types. One of them corresponds to a resting voltage Vm that is the ground level in liquid crystal drive, and another corresponds to system power supply voltages Vd1 and Gnd for operating later-described level shifters in the scanning electrode driving ICs 3 and 4. The remaining one corresponds to control signals which are composed of a clock signal LOAD, a start signal FR, a polarity control signal DF, a reset signal, a resting control signal, and so on. It should be noted that the signal electrode driving IC 2 includes an image memory and a display control circuit and further controls the scanning electrode driving ICs 3 and 4.

In the signal electrode driving IC 2, signal electrode driving terminals (not shown) are arranged at the lower side and directly connected to the signal electrodes 13 by the ITO wirings on the upper substrate 1.

Figure 4:
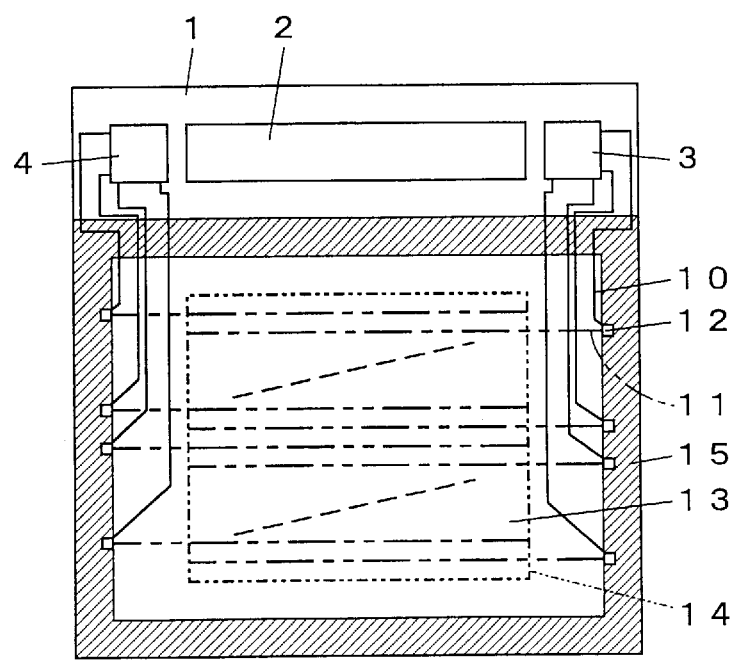
FIG. 4 is a view for explaining an arrangement of connecting wirings connected to scanning electrodes of the same.

FIG. 4 shows only members associated with the connection between the scanning electrodes 11 and the electrode driving IC. As shown in this drawing, the scanning electrodes 11 and the connecting wirings 10 are electrically connected to each other through the sealing portion 15 composed of the ACF at connecting regions 12. The connecting regions 12 are arranged outside the connecting wirings 10 as viewed from the image display portion 14. The connecting wirings 10 drawn from the scanning electrode driving ICs 3 and 4 run on the inner side of the sealing portion 15, that is, between the sealing portion 15 and the image display portion 14 and extend to the connecting regions 12.

The provision of the connecting wirings 10 between the image display portion 14 and the sealing portion 15 as described above makes it possible to decrease the space required for the wirings and to reduce the size of the substrates as compared to the case in which the connecting wirings are provided outside the sealing portion 15 as in the prior art.

Figure 17:
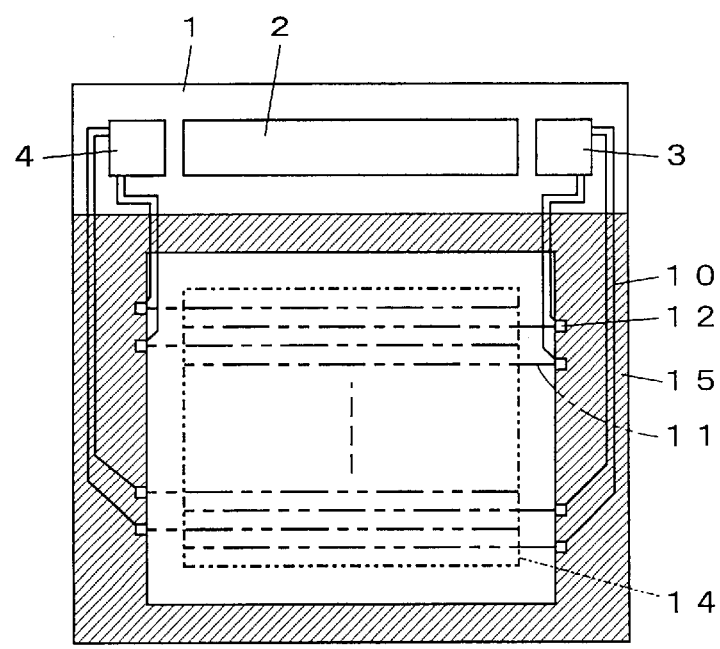
FIG. 17 is a view showing another example thereof.
Figure 18:
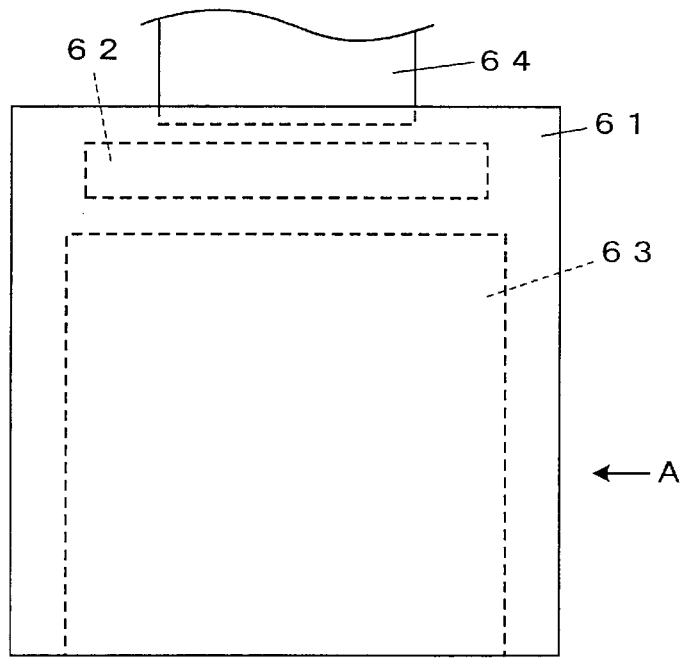
FIG. 18 is a plan view of a conventional liquid crystal display device.
Figure 19:
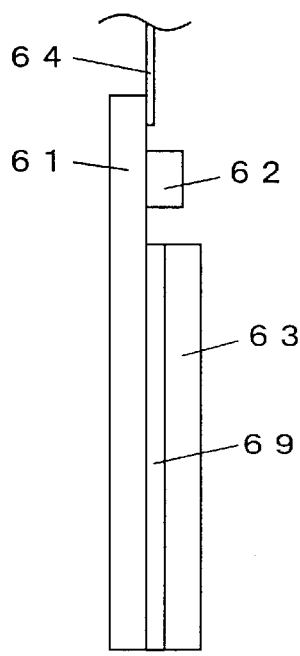
FIG. 19 is a side view thereof as viewed from a direction of an arrow A in FIG. 18.
Figure 20:
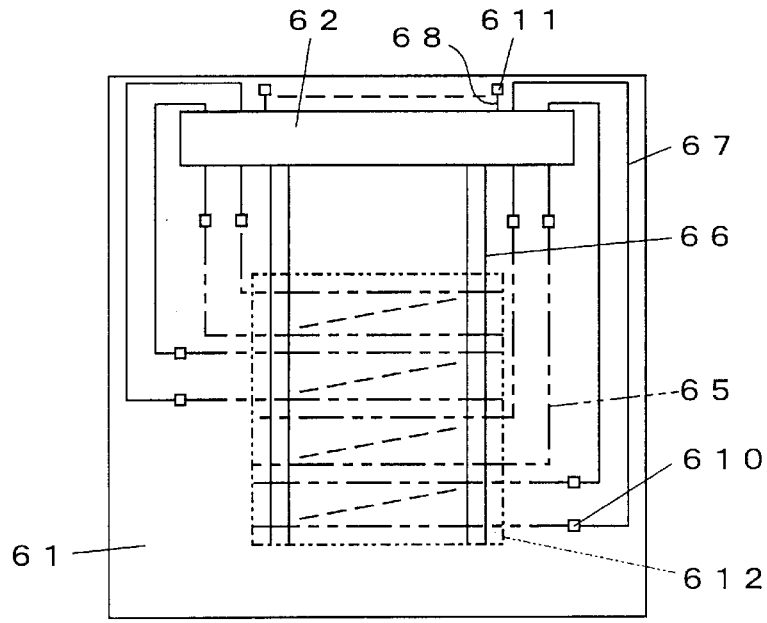
FIG. 20 is a plan view showing an arrangement of electrodes in the liquid crystal display device.
Figure 21:
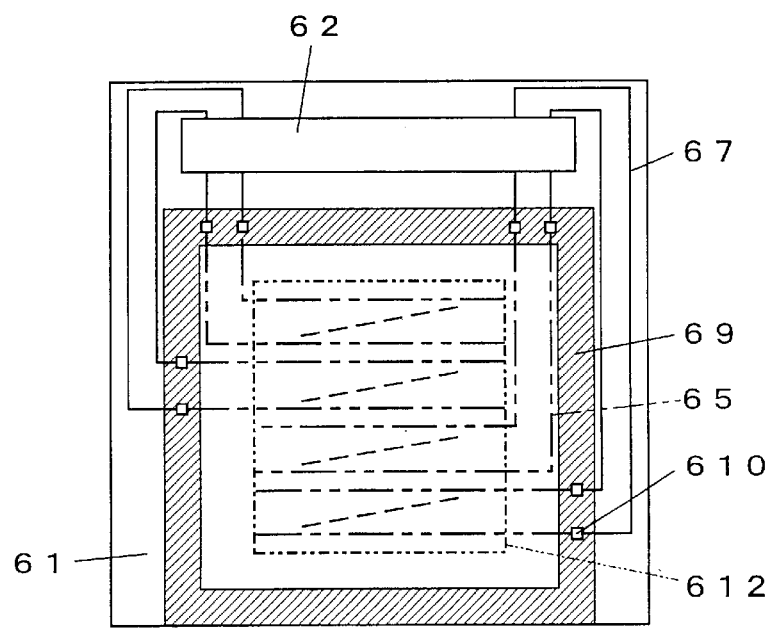
FIG. 21 is a view for explaining an arrangement of connecting wirings connected to scanning electrodes in the liquid crystal display device.

It should be noted that it is not necessary to run all of the connecting wirings 10 between the sealing portion 15 and the image display portion 14, and this case will be explained later using FIG. 17.

Further, there is no wiring outside the sealing portion 15 at a portion where the upper substrate 1 and the lower substrate 5 oppose each other, and the upper substrate 1 and the lower substrate 5 are cut from others at a position along the sealing portion except the side of the upper substrate 1 where the electrode driving ICs are mounted, so that the external shapes of sides of the substrates match the external shape of the sealing portion 15 at the portion.

Normally, when fabricating a liquid crystal display device, a pair of large substrates (mother glasses in the case of glass substrates) are bonded together with a sealing portion, and required portions are cut out therefrom to produce a plurality of liquid crystal cells in which the substrates are already bonded together with the sealing portion.

The cutting along the sealing portion here as described above decreases external shape tolerance when a single liquid crystal cell is separated from the large substrates. In the case of using a device (called a scriber) which makes an incision on the glass and breaks it, when only the upper substrate is broken, for example, at a position a little apart from the sealing portion, a crack of about 0.5 mm is generated at each side. On the other hand, when it is broken at the position of the sealing portion, the crack is within 0.1 mm. Therefore, the cutting of the substrates at the position of the sealing portion, as in this liquid crystal display device, can reduce extra space provided in consideration of the cracks in addition to an area required for the wirings themselves, so that the external shape of the liquid crystal display device can be decreased.

Further, the connecting wirings are provided on the inner side of the sealing portion, so that when a plurality of liquid crystal display devices are cut out from the large substrates, an effect such as generation of fragments, breakage, or the like in cutting is not caused in the connecting regions, thereby realizing reliable liquid crystal display devices.

In the scanning electrode driving ICs 3 and 4, the scanning electrode driving terminals (not shown) are arranged on the image display portion 14 side and an edge side of the upper substrate 1, that is, on two sides where the wirings 8 and 9 are not provided. In addition, odd-numbered scanning electrodes 11 in the image display portion 14 are connected to the scanning electrode driving IC 4 on the left-hand side, and even-numbered scanning electrodes 11 are connected to the scanning electrode driving IC 3 on the right-hand side. Such an arrangement is effective when two scanning electrode driving ICs are used and arranged on both sides of the signal electrode driving IC as in this liquid crystal display device.

In other words, when a plurality of scanning electrode driving ICs are arranged as in this liquid crystal display device, the scanning electrode driving ICs might have an obvious difference in driving performance. However, in this case, since the scanning electrodes connected to one scanning electrode driving IC and the scanning electrodes connected to the other are alternately arranged as described above, this permits adjacent scanning electrodes to be connected to different scanning electrode driving ICs, which makes the individual difference between the scanning electrode driving ICs less obvious, resulting in improved display quality.

Figure 5:
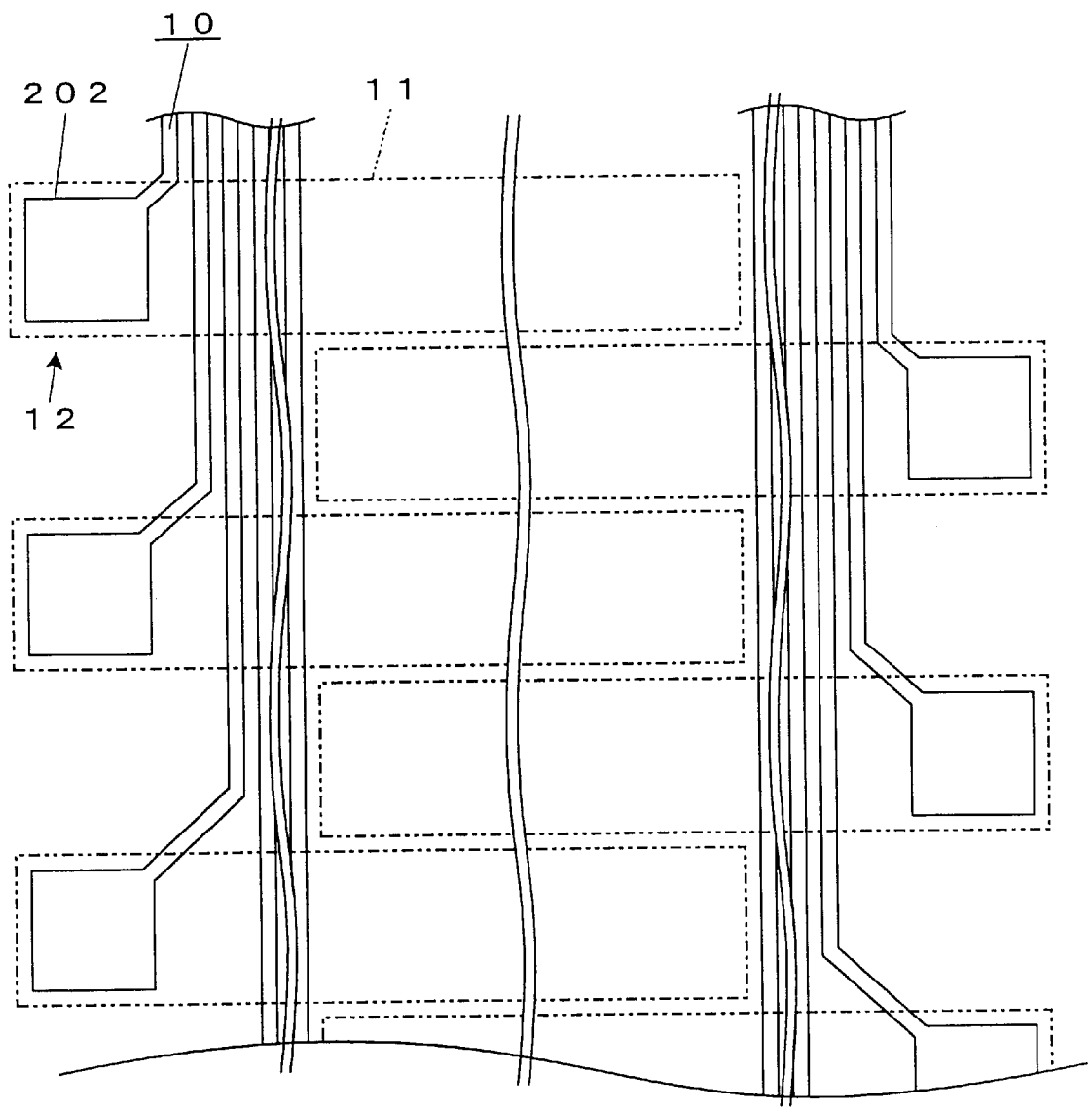
FIG. 5 is an enlarged view of the shape of the electrode only around the connecting region of the same.

Next, features of the shape of the electrode around the connecting region 12 are explained. FIG. 5 is an enlarged view of the shape of the electrodes only around the connecting regions 12. The electrodes provided on the upper substrate 1 are shown by solid lines and the electrodes provided on the lower substrate 5 are shown by phantom lines.

The connecting wirings 10 on the upper substrate 1 side are formed at a pitch of 40 $\mu$m, and each end portion 202 thereof forming the connecting region 12 is formed in the shape of a square as shown in FIG. 5. The end portion 202 has an area of 0.1 mm$^2$. On the other hand, the scanning electrodes 11 shown by the phantom lines are formed in the shape of a belt having a fixed width, and electrically connected to the end portion 202 of the connecting wiring 10 at the connecting portion 12 through the sealing portion 15.

By the way, it has been described above that the scanning electrode driving ICs 3 and 4 are driven by the oscillation power supplies VDD, VCC and VSS. This oscillation power supply is a power supply having a period in which the potential thereof changes with time, and the reason why such an oscillation power supply is employed is to reduce the size of the scanning electrode driving ICs 3 and 4. This oscillation power supply and a method of driving this liquid crystal display device are explained here.

Figure 6:
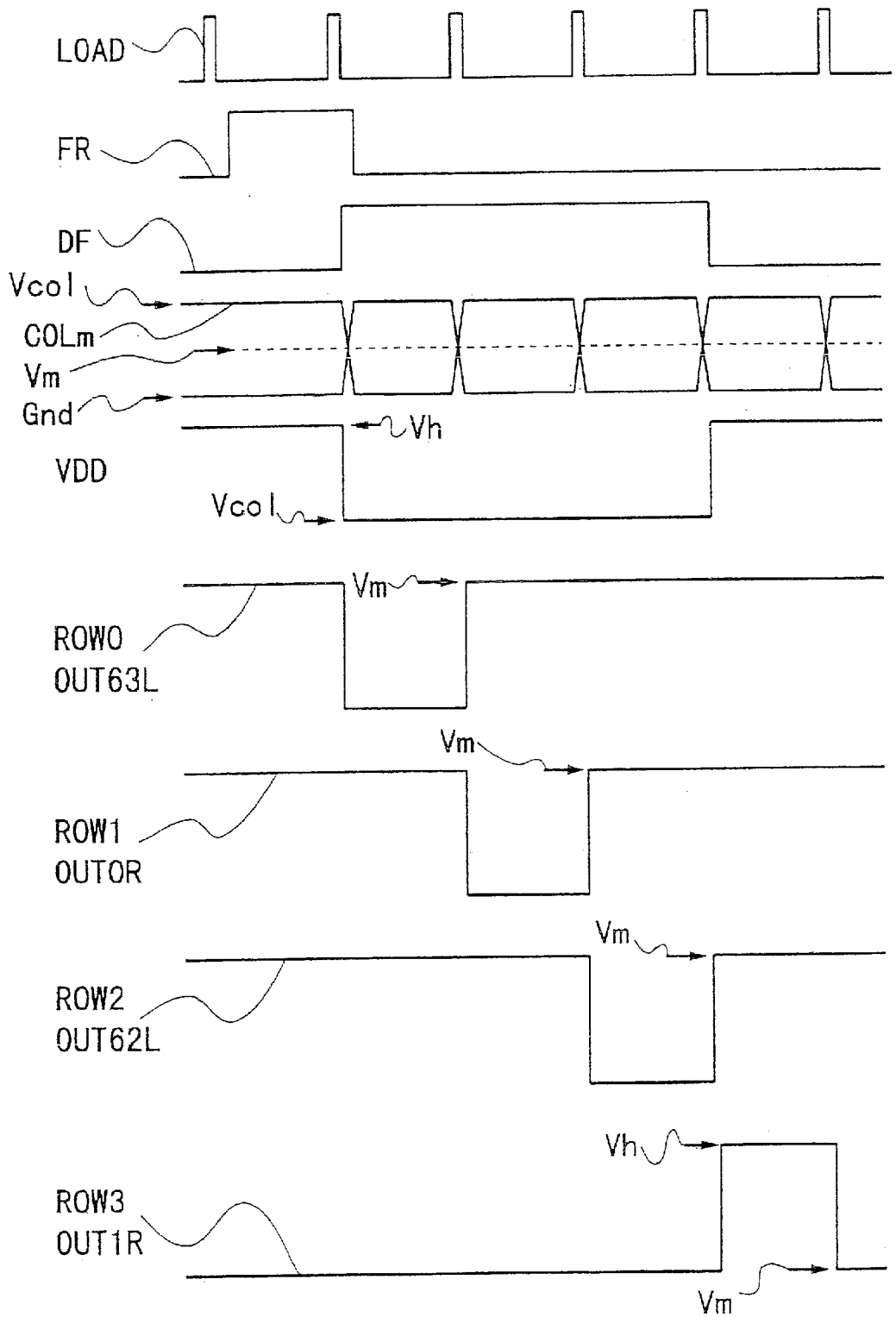
FIG. 6 is a waveform diagram showing changes in voltage of oscillation power supplies with time with a control signal.

FIG. 6 is a waveform diagram showing changes in voltage of the oscillation power supplies with time together with the control signal. The polarity control signal DF which is generated by the signal electrode driving IC 2 is a signal for controlling the polarity for AC driving of this liquid crystal display device and periodically inverted. This signal is generated by receiving a power supply from a system power supply which is supplied from an external circuit, and its logic level is the voltage Vd1 on the upper level and the ground voltage Gnd on the lower level.

The voltage waveforms of the oscillation power supplies VDD, VCC and VSS are generated by amplification and voltage clamp of the polarity control signal DF. The voltages Gnd, Vm, Vd1, Vcol and Vh shown in FIG. 6 are the ground voltage, the resting voltage, the voltage of the system power supply, a voltage on the upper level for driving the signal electrode, and a high voltage for selection pulse, respectively.

The voltage of the oscillation power supply VDD on a high voltage side is of a square wave and inverse to the polarity control signal DF, and has a maximum value of the voltage Vh and a minimum value of the voltage Vcol. The voltage of the oscillation power supply VCC for logic is of a square wave in the same shape as that of the oscillation power supply VDD, and its maximum voltage is clamped at the voltage Vd1. The voltage of the oscillation power supply VSS, which corresponds to the ground of the oscillation power supply system, is also of a square wave in the same shape as that of the oscillation power supply VDD, and its maximum voltage is clamped at the ground voltage Gnd.

It should be noted that the resting voltage Vm is shown here because it is the reference voltage for driving the liquid crystal panel, though it has no direct relation to the oscillation power supplies. Further, the resting voltage Vm has an intermediate value between the voltage Vcol that is the upper level for driving the signal electrode and the voltage Gnd (the ground voltage is used as the voltage at the lower level of the signal electrode driving waveform) that is the lower level for driving the signal electrode.

The voltage Vd1 of the system power supply is 2.5 V. Further, in this liquid crystal display device, the number of scanning electrodes shall be 128, and Alt and Pleshko technique (APT) that is a first suggested voltage averaging method is used. This method forms a driving waveform for a pixel by combining a selection pulse at a high voltage outputted from the scanning electrode driving circuit and a signal electrode driving waveform at a low voltage outputted from the signal electrode driving circuit. In this embodiment, the voltage Vcol on the upper level for driving the signal electrode is set at about 3 V, the resting voltage Vm is set at about 1.5 V, and the high voltage Vh is set at about 15 V.

Figure 7:
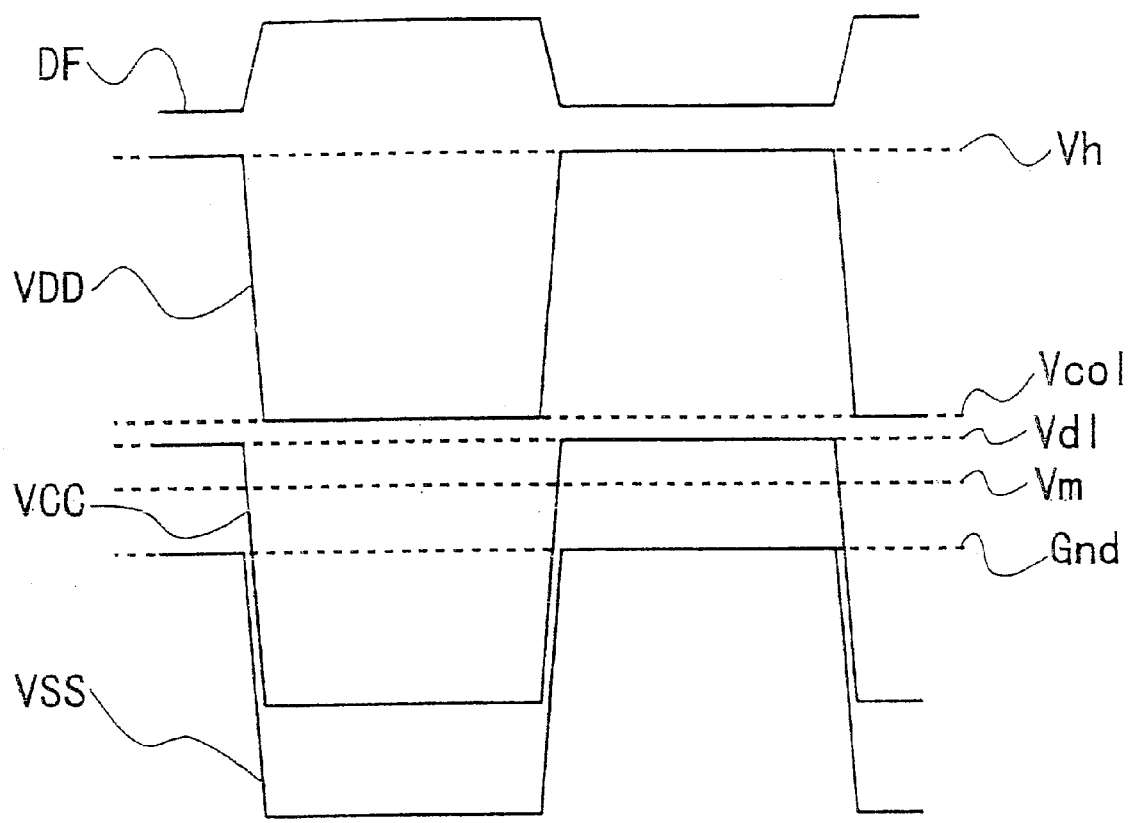
FIG. 7 is a waveform diagram showing waveforms of the control signals and electrode driving signals of the same.

Next, the relationship between the control signal generated by the signal electrode driving IC 2 and the electrode driving waveforms is explained. FIG. 7 is a waveform diagram showing the control signal and the electrode driving waveforms.

The clock signal LOAD, the start signal FR, and the polarity control signal DF compose the control signal outputted from the signal electrode driving IC 2 and have logic levels of the voltage Vd1 that is the system power supply and the ground voltage Gnd. An output waveform COLm of an mth signal electrode driving terminal in the signal electrode driving IC 2 is also of a binary waveform and has the voltage Vcol on the upper level and the ground voltage Gnd on the lower level. The resting voltage Vm, as described above, is the intermediate voltage between the voltage Vcol and the ground voltage Gnd. Since this liquid crystal display device adopts line-sequential driving, display data on an mth signal electrode is changed in synchronism with a falling edge of the clock signal LOAD. The signal electrode driving waveform COLm in this event is an exclusive OR of the display data and the polarity control signal DF.

The oscillation power supply VDD on the high voltage side, having a maximum voltage of the high voltage Vh and a minimum voltage of the voltage Vcol as described above, is inverse to the polarity control signal DF. Incidentally, the illustration of the oscillation power supply VCC for logic and the oscillation power supply VSS for ground is omitted in FIG. 6.

Driving waveforms ROW0, ROW1, ROW2 and ROW3 for first to fourth scanning electrodes include selection pulses in respective periods, in which respective scanning electrodes are selected, and are at the resting voltage Vm during the other periods respectively. It should be noted that the first to fourth scanning electrodes are connected to a 64th output terminal OUT63L in the scanning electrode driving IC 4 on the left-hand side, a first output terminal OUT0R in the scanning electrode driving IC 3 on the right-hand side, a 63rd output terminal OUT62L in the scanning electrode driving IC 4 on the left-hand side, and a second output terminal OUT1R in the scanning electrode driving IC 3 on the right-hand side respectively.

When generating these driving waveforms for the scanning electrodes, the clock signal LOAD, the start signal FR and the polarity control signal DF generated by the voltage of the system power supply system are voltage-converted to voltages of the oscillation power supply system by the level shifters embedded in the scanning electrode driving ICs 3 and 4 in order to control the scanning electrode driving ICs 3 and 4 which are operated by the oscillation power supplies VDD, VCC and VSS. This voltage conversion is carried out by the following two steps.

First of all, the control signals LOAD, FR and DF are level-shifted such that their high levels become the voltage Vd1 and their low levels become the voltage of the oscillation power supply VSS for ground. Then, the control signals are level-shifted such that their high levels become the voltage of the oscillation power supply VCC for logic and their low levels become the voltage of the oscillation power supply VSS for ground. As a result, the control signals LOAD, FR and DF at the voltage of the system power supply system are level-shifted to be at the voltages of the oscillation power supply system in which the high levels are the voltage of the oscillation power supply VCC for logic and the low levels are the voltage of the oscillation power supply VSS for ground. Since the potential difference between the oscillation power supply VCC for logic and the oscillation power supply VSS for ground has a small value (2.5 V) and is fixed in the scanning electrode driving ICs 3 and 4, a low-voltage circuit can be used for control logic circuits of the scanning electrode driving ICs 3 and 4.

The scanning electrode driving ICs 3 and 4 generate selection timings for the scanning electrodes in sequence in synchronism with falling edges of the clock signal LOAD when they detect that the start signal FR turns to high level. In this event, the scanning electrode driving IC 4 on the left-hand side outputs a selection pulse in each cycle of even numbers such as 0, 2, 4, . . . with reference to the start timing (the output terminals are selected in an inverse order), and the scanning electrode driving IC 3 on the right-hand side outputs a selection pulse in each cycle of odd numbers such as 1, 3, 5, . . . (the output terminals are selected in a right order).

Further, the output terminals of the scanning electrode driving ICs 3 and 4 function as switches for selecting one voltage from among three voltages of the oscillation power supply VDD on the high voltage side, the voltage of the oscillation power supply VSS for ground, and the resting voltage Vm. During the selection period for outputting the selection pulse, each output terminal outputs the voltage of the oscillation power supply VSS when the polarity control signal DF is at high level, and outputs the voltage of the oscillation power supply VDD when the polarity control signal DF is at low level. Each output terminal outputs the resting voltage Vm during the period during which it does not select its scanning electrode.

In a 0th cycle, since the polarity control signal DF is at high level, the scanning electrode driving IC 4 on the left-hand side outputs the voltage of the oscillation power supply VSS to the first scanning electrode which is connected to the connecting terminal of the 64th (the maximum number). Since the voltage of the oscillation power supply VSS oscillates to the lower side in this event, a selection pulse (negative polarity) having a large amplitude on the lower side appears on the driving waveform ROW0 for the scanning electrode. Similarly, in a first and a second cycle, selection pulses having a negative polarity appear on the driving waveforms ROW1 and ROW2 for the second and third scanning electrodes. In a third cycle, since the control signal DF is inverted, a selection pulse with a positive polarity (the pulse voltage is at Vh) appears on the driving waveform ROW3 for the fourth scanning electrode.

In order to achieve the AC driving, the cycle of inverting the polarity control signal DF is set such that the polarity control signal DF is phase shifted on a frame-to-frame basis with respect to the start signal FR, and the driving waveform for each pixel is formed by a difference between the scanning electrode driving waveform and the signal electrode driving waveform for the pixel.

When such driving is performed, the voltage difference (equal to Vh) between the oscillation power supplies VDD and VSS is applied to the high voltage portions of the scanning electrodes driving ICs 3 and 4 using the oscillation power supplies. Meanwhile, the selection pulses of the positive polarity and the negative polarity have values of ±(Vh−Vm) with respect to the resting voltage Vm. Therefore, in order to realize a desired selection pulse amplitude (2×(Vh−Vm)), it is only required to apply the voltage (Vh) which is half the selection pulse amplitude to the scanning electrode driving ICs 3 and 4 which are driven by the oscillation power supplies. Consequently, as compared to the case in which a required withstand voltage is equal to the selection pulse amplitude, the scanning electrode driving ICs 3 and 4 need about half the withstand voltage, so that the areas thereof can be reduced to about a quarter.

In the one-chip electrode driving IC as shown in FIG. 18 to FIG. 21, with development in function, necessary logic processing and memory increase to require a micro fabrication process. Further, with an increase in the number of display digits, the driving voltage also increases to require a fabrication process for high withstand voltage. As a result, the one-chip electrode driving IC which requires these different fabrication processes remarkably increases in cost because of a decrease in yield due to a long series of fabrication steps and an increase in area.

Hence, as in this liquid crystal display device, the electrode driving IC is separated into the scanning electrode driving IC and the signal electrode driving IC to reduce the fabrication steps of the scanning electrode driving IC and to reduce the size of each electrode driving IC, thereby increasing the yield to achieve cost reduction. The driving of the scanning electrode driving IC by the oscillation power supplies enables further reduction in the size of the scanning electrode driving IC so as to achieve further cost reduction.

It can be said that this cost reduction greatly influences the cost reduction of the liquid crystal display device because the electrode driving IC is an expensive portion in the liquid crystal display device. Further, according to the COG mounting method, it is possible to arrange on the same substrate the image display portion that is a group of fine wirings and the connecting regions of the electrode driving IC having a fine terminal pitch, so that the fabrication cost can be reduced as a whole. Furthermore, in the case of using the COG method, the reduction in size of the electrode driving IC leads to a corresponding reduction in the region required for mounting the electrode driving IC, so that the external shape of the liquid crystal display device can be reduced.

By the way, in the case of this liquid crystal display device, as shown in FIG. 4 and FIG. 5, the scanning electrodes 11 and the connecting wirings 10 oppose each other with a liquid crystal layer 20 sandwiched therebetween on the inner side of the sealing portion 15. Further, signals with different waveforms are applied to one scanning electrode 11 and the connecting wirings 10 which are connected to the scanning electrodes other than this scanning electrode 11, so that a voltage is applied to the liquid crystal layer at portions where these oppose each other. This point is explained taking an example of the behavior at an intersection of an nth scanning electrode and a connecting wiring connected to an (n+2)th scanning electrode.

In a period in which the nth scanning electrode is selected, the selection pulse is applied to this electrode, but the (n+2)th scanning electrode is not selected and the resting voltage Vm is thus applied to the connecting wiring 10 connected to the (n+2)th scanning electrode. Accordingly, a voltage corresponding to the pulse height of the selection pulse is applied to the intersection thereof. On the other hand, in a period in which the (n+2)th scanning electrode is selected, while the resting voltage Vm is applied to the nth scanning electrode, the selection pulse is applied to the connecting wiring 10 connected to the (n+2)th scanning electrode. Therefore, the voltage corresponding to the pulse height is applied again to the intersection. Consequently, the voltage is applied to the opposing portion twice in one frame period, resulting in the opposing portion turning into an ON display state.

A region irrelevant to the display turning into the ON display state as described above causes deterioration in the image quality as a whole. The liquid crystal display device is thus provided with means for shielding the ON display state. This means is explained next.

Figure 8:
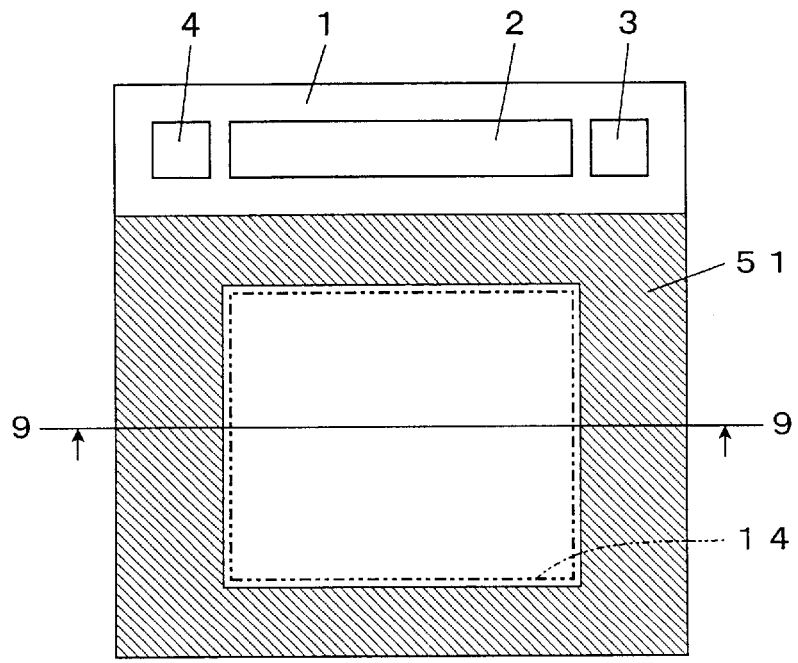
FIG. 8 is a plan view showing the state of the same provided with a shielding.
Figure 9:
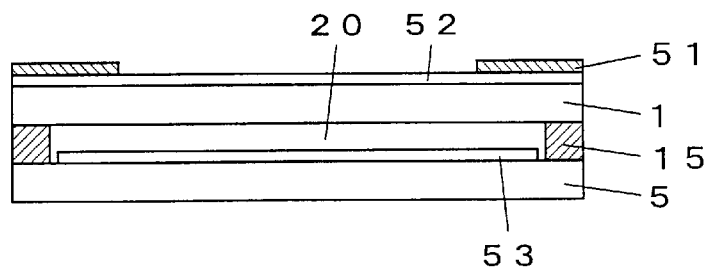
FIG. 9 is a cross-sectional view showing a cross-section taken along a line 9—9 in FIG. 8.
Figure 10:
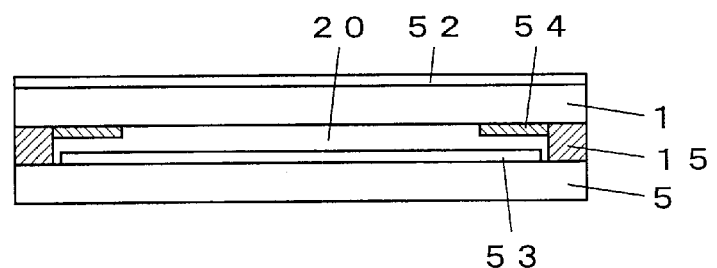
FIG. 10 is a cross-sectional view, corresponding to FIG. 9, showing another arrangement example of the shielding.

FIG. 8 is a plan view showing the state of this liquid crystal display device provided with a shielding, FIG. 9 is a cross-sectional view showing a cross-section taken along a line 9—9 in FIG. 8, and FIG. 10 is a cross-sectional view, corresponding to FIG. 9, showing another arrangement example of the shielding. It should be noted that the illustration of the electrodes is omitted in these drawings.

As shown in FIG. 8 and FIG. 9, this liquid crystal display device is provided with a shielding 51 as means for shielding the above-described ON display. This shielding is preferably provided at least at a portion corresponding to the region where the scanning electrodes 11 and the connecting wirings 10 oppose each other, and, more preferably, provided at a portion corresponding to a region between the image display portion 14 and the sealing portion 15. In this embodiment, the shielding 51 is provided at a portion larger than the aforesaid portion, the entire region outside the image display portion 14. Further, this shielding 51 is formed here by printing a nontransparent black resin. This configuration is effective to both a reflection-type liquid crystal display device and a transmission-type liquid crystal display device.

It should be noted that, as shown in FIG. 9, this liquid crystal display device is a reflection-type liquid crystal display device which is provided with a polarizer 52 on the visible side of the upper substrate 1 and a reflection layer 53, which reflects light, on the liquid crystal layer 20 side of the lower substrate 5, and performs display utilizing the polarization property of the polarizer 52. The shielding 51 is formed by the screen printing on the polarizer 52.

As a method for forming the shielding 51, a method of electrodepositing a resin or the like may appropriately be employed in addition to the aforesaid method. As the material of the shielding 51, a low-reflection metal or the like can also be used. Further, the arrangement position of the shielding 51 in the vertical direction is not limited to the visible side (the upper side in FIG. 9) of the polarizer 52, but is preferably provided at a position corresponding to the region between the image display portion 14 and the sealing portion 15 as viewed from the visible side. More specifically, for example, as shown in FIG. 10, a black matrix 54 may be provided, as a shielding, using a low-reflection metal at a position corresponding to the region between the image display portion 14 and the sealing portion 15 on the liquid crystal layer 20 side of the upper substrate 1.

When viewing, from the upper substrate side, the liquid crystal display device formed with such a shielding, the portion provided with the shielding can look black to shield the ON display at the intersection of the scanning electrode 11 and the connecting wiring 10 so as to prevent deterioration in the image quality as a whole.

Consequently, the configuration of the liquid crystal display device as described above can realize a liquid crystal display device which is small and reliable and has a low cost and an excellent display quality.

It should be noted that the liquid crystal display device to which this invention is applied is not limited to one which uses the polarizer and the reflector, but the present invention can also be applied to liquid crystal display devices of a transmission type using no reflector and a scattering type using neither polarizer nor reflector. Further, the invention can also be applied to a device using a polarizer and a retardation film laminated one on the other.

Furthermore, even when the arrangement of the above-described connecting wirings and the shielding is applied to the liquid crystal display device using a one-chip electrode driving IC as in the prior art, effects presented by the arrangement of connecting wirings and the shielding can be provided.

Figure 11:
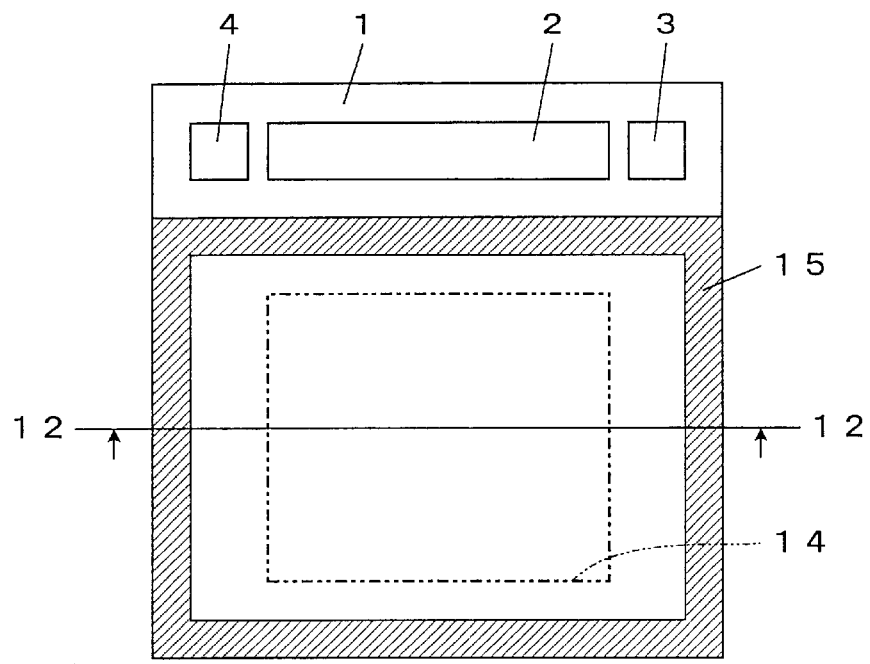
FIG. 11 is a plan view showing a configuration of a liquid crystal display device of a first modification of the embodiment of the invention.
Figure 12:
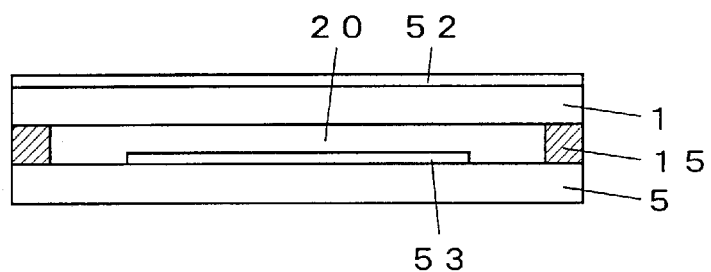
FIG. 12 is a cross-sectional view taken along a line 12—12 in FIG. 11.
Figure 13:
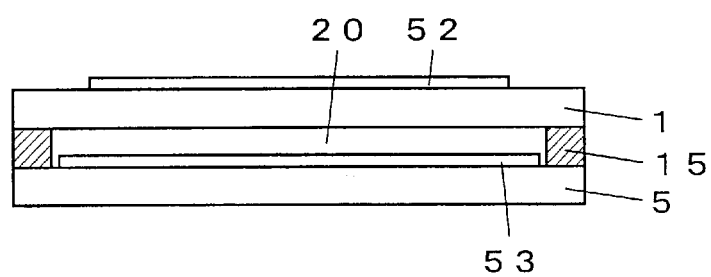
FIG. 13 is a cross-sectional view, corresponding to FIG. 12, showing another configuration example thereof.

Modification of First Embodiment: FIG. 11 to FIG. 13

A first modification of the above-described embodiment is explained next. FIG. 11 is a plan view showing a configuration of a liquid crystal display device of this modification, FIG. 12 is a cross-sectional view taken along a line 12—12 in FIG. 11, and FIG. 13 is a cross-sectional view, corresponding to FIG. 12, showing another configuration example. The illustration of the electrodes is omitted in these drawings. Further, the same members as those explained in the above-described embodiment are assigned the same numerals.

As shown in FIG. 11 and FIG. 12, the liquid crystal display device of the first modification is not provided with the shielding which is provided in the liquid crystal display device in the above-described embodiment, and instead, a reflection layer 53 is provided at a portion other than the region between the image display portion 14 and the sealing portion 15. The reflection layer 53 is not provided here at a portion corresponding to the region between the image display portion 14 and the sealing portion 15 but only at a portion, corresponding to the image display portion 14, on the liquid crystal layer 20 side of the lower substrate 5. On the other hand, the polarizer 52 is provided all over the upper substrate 1.

This configuration makes it impossible for an observer to view reflected light by the reflection layer 53 at a portion other than the image display portion 14, so that the display is extremely difficult to view there. Consequently, it is possible to make it difficult to view the ON display produced by the scanning electrode 11 and the connecting wiring 10 at the region between the image display portion 14 and the sealing portion 15 as in the above-described embodiment. Incidentally, this modification can be applied only to a reflection-type liquid crystal display device with the reflection layer 53.

It should be noted that although the example in which the reflection layer 53 is disposed on a face on the liquid crystal layer 20 side of the lower substrate 5 is shown here, the same result is also presented even in the case in which a reflector is provided on a face on the opposite side to the liquid crystal layer 20 of the lower substrate 5. Further, it is only required that the reflection layer 53 not be provided at least at the portion corresponding to the region where the scanning electrodes 11 and the connecting wirings 10 oppose each other.

In addition to the above, in a liquid crystal display device which performs display using the polarization property of a polarizer, the polarizer 52 may be provided at a portion other than the region between the image display portion 14 and the sealing portion 15 as shown in FIG. 13. The polarizer 52 is not provided here at a portion corresponding to the region between the image display portion 14 and the sealing portion 15 but only at a portion, corresponding to the image display portion 14, on the visible side of the upper substrate 1. In this case, the reflection layer 53 may be provided substantially at the entire region on the inner side of the sealing portion 15.

In this configuration, even when the optical condition of the liquid crystal layer 20 changes by the application of a voltage, the observer cannot view the change of the portion other than the image display portion 14, so that the display of the portion is extremely difficult to view. Consequently, it is possible to make it difficult to view the ON display at the region between the image display portion 14 and the sealing portion 15 as in the above-described case.

Incidentally, it is only required that the polarizer 52 not be provided at the portion corresponding to the region where the scanning electrodes 11 and the connecting wirings 10 oppose each other.

Second Modification: FIG. 14

A second modification of the above-described embodiment is explained next. FIG. 14 is a view showing a configuration of the electrodes near the connecting portions between the scanning electrodes and the connecting wirings in a liquid crystal display device of this modification. In this drawing, the scanning electrodes provided on the lower substrate are shown by broken lines, and the same members as those explained in the above-described embodiment are assigned the same numerals.

This modification is characterized in that a low-reflection chrome (Cr) layer is provided on the connecting wirings 10 and so on. This low-reflection chrome is a metal which has been conventionally used as a black matrix to prevent light leakage from between the pixels. A portion provided with the chrome layer is shown with hatching in FIG. 14.

In this liquid crystal display device, as shown in FIG. 14, a portion of the connecting wiring 10 existing between the sealing portion 15 and the image display portion 14 is formed of ITO and the low-reflection chrome laminated one on the other. Further, the connecting wiring 10 is formed in a manner to have a large width in the vicinity of an end portion 202 (the connecting region 12), so that the width of a region where the connecting wirings are provided is substantially fixed as a whole. Further, a solid pattern region C3 made of the low-reflection chrome layer is provided on the face provided with the connecting wirings 10 of the upper substrate 1 at a periphery of the lower side of the image display portion 14, that is, a region where neither signal electrodes 13 nor connecting wirings 10 exist. It should be noted that although only five connecting wirings 10 are shown in FIG. 14, it is of course to actually form the connecting wirings 10 of the number necessary for the display of all the pixels.

On the other hand, the scanning electrodes 11 formed on the lower substrate 5 are the same as those in the case of the above-described embodiment, and connected to the end portions 202 of the connecting wirings 10 through the conductive particles in the sealing portion 15 at the connecting regions 12.

Further, the portion where the scanning electrode 11 and the signal electrode 13 made of ITO on the upper substrate 1 oppose each other is the pixel portion (C1, here) as described above, and the low-reflection chrome layer is also laminated on ITO at a boundary portion C2 between the pixels on the signal electrode 13. It should be noted that the signal electrode 13 is formed only of ITO at the pixel portion C1.

The configuration of the other portion in this modification is the same as that of the embodiment, and thus the description thereof is omitted. In the application of this modification, it is not always necessary to provide the shielding which is explained in the embodiment.

The low-reflection chrome layer is provided on the connecting wirings 10 as described above, whereby the low-reflection chrome layer is formed at the region between the image display portion 14 and the sealing portion 15 on the liquid crystal layer side of the upper substrate 1 except gaps between the connecting wirings 10. Thus, the ON display at the intersection of the scanning electrode 11 and the connecting wiring 10 can be shielded by the chrome layer.

Meanwhile, in the case in which the low-reflection chrome layer is not provided at the solid pattern region C3, the black of this region is different from the black of the region of the connecting wirings 10 provided with the low-reflection chrome layer, which might impair the display quality. Hence, the low-reflection chrome layer shall be provided also at the region between the image display portion 14 and the sealing portion 15 other than the region of the connecting wirings 10. The provision of the chrome layer at this region C3, however, is not essential to this invention. Further, it is for the same reason as the above that the width of the connecting wiring 10 is made large in the vicinity of the end portion 202, and thus it is not an essential configuration to this invention.

Further, the connecting wiring 10, whose width is often made to be about 20 μm to about 50 μm, is prone to increase in the resistance from the electrode driving IC to the scanning electrode 11. With the increase in the resistance, the driving waveform of the scanning electrode 11 also deforms more greatly, which presents a problem of deterioration in image quality such as crosstalk. Since the low-reflection chrome has a sheet resistance of about one-tenth that of ITO, the provision of the low-reflection chrome layer is also effective in reducing the resistance of the connecting wiring 10.

It has been conventionally performed that a low-reflection chrome region is provided at the boundary portions C2 on the signal electrode 13 as a black matrix to reduce the light leakage from between the pixels so as to improve the contrast. The chrome layer on the connecting wirings 10 and at the solid pattern region C3 can be provided simultaneously with the chrome layer as the black matrix, which makes it possible to shield unnecessary ON display without increasing the fabrication steps.

Figure 15:
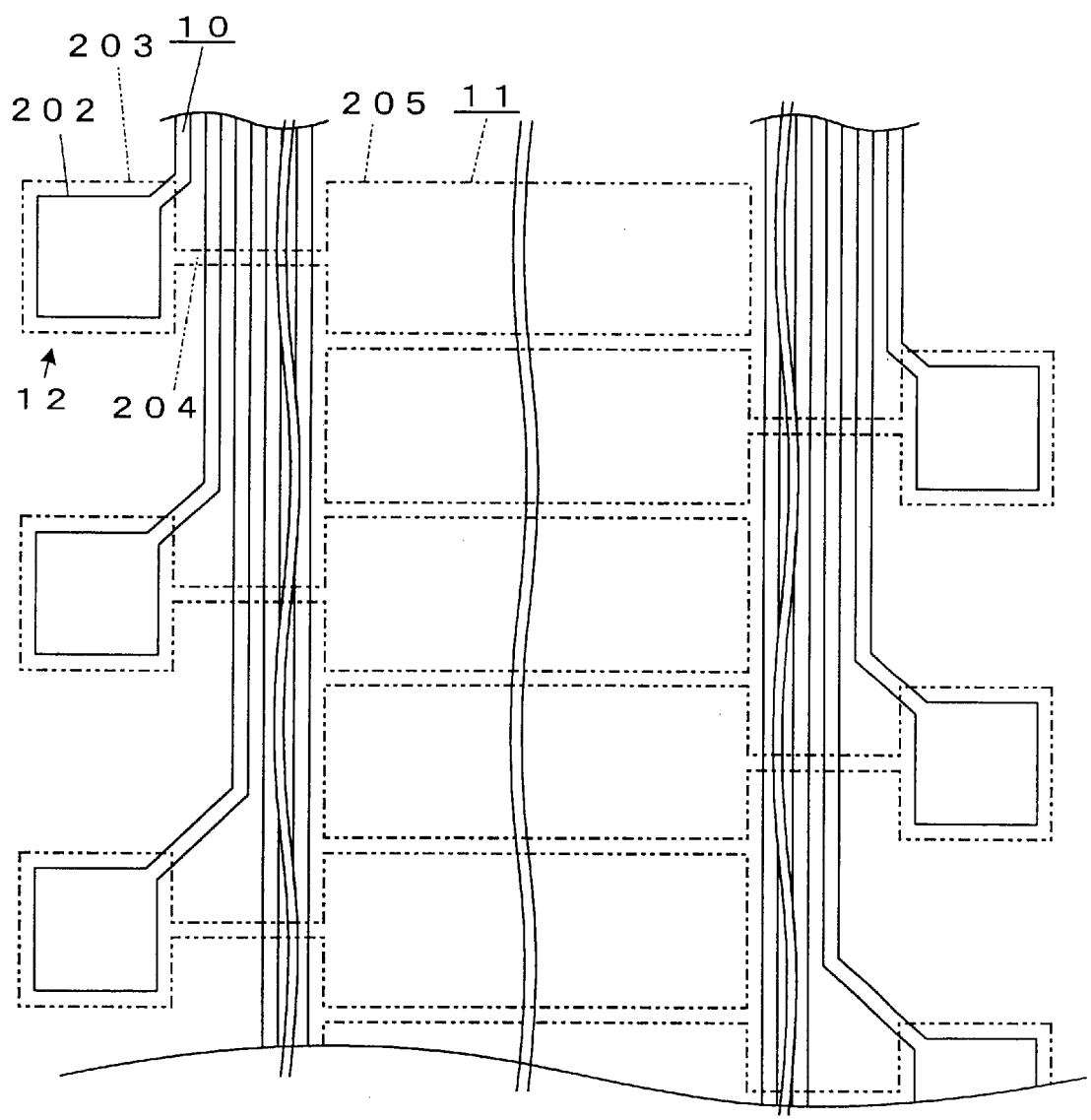
FIG. 15 is a view showing an arrangement of the electrodes near the connecting portions between the scanning electrodes and the connecting wirings in a liquid crystal display device of a third modification of the embodiment of the invention.

Third Modification: FIG. 15

A third modification of the above-described embodiment is explained next. FIG. 15 is a view showing an arrangement of the electrodes near the connecting portions between the scanning electrodes and the connecting wirings in a liquid crystal display device of this modification and is a drawing corresponding to FIG. 5 of the above-described embodiment. In this drawing, the same members as those explained in the above-described embodiment are assigned the same numerals.

In this modification, as shown in FIG. 15, the scanning electrode 11 is provided with an end portion 203, a thin portion 204, and a thick portion 205. The end portion 203 is a portion electrically connected to the end portion 202 of the connecting wiring 10 through the sealing portion 15 at the connecting region 12, and the thick portion 205 is a portion opposing the signal electrode 13 in the image display portion 14 to form a pixel. The thin portion 204 is provided at least at a portion where the connecting wiring 10 and the scanning electrode 11 oppose each other at a region except the connecting region 12, and the scanning electrode is formed to be thinner at this portion than in the image display portion 14.

The configuration of the other portion in this modification is the same as that of the embodiment, and thus the description thereof is omitted.

The scanning electrode 11 is made thinner at the portion where the connecting wiring 10 and the scanning electrode 11 oppose each other to decrease the opposing portion in area, so that even when the opposing portion turns into the ON display state, the display is made less conspicuous to improve the display quality as a whole.

Meanwhile, it is conceivable that capacitive coupling at the opposing portion might cause undesired noise to appear on a signal to be applied to the scanning electrode. The capacitive coupling can be reduced by making the scanning electrode thin at the opposing portion as described above to reduce the noise appearing on the signal to be applied to the scanning electrode, thereby preventing deterioration in display quality.

The configuration of this modification becomes more effective in a combination with the configuration of the first modification and/or the second modification.

Figure 16:
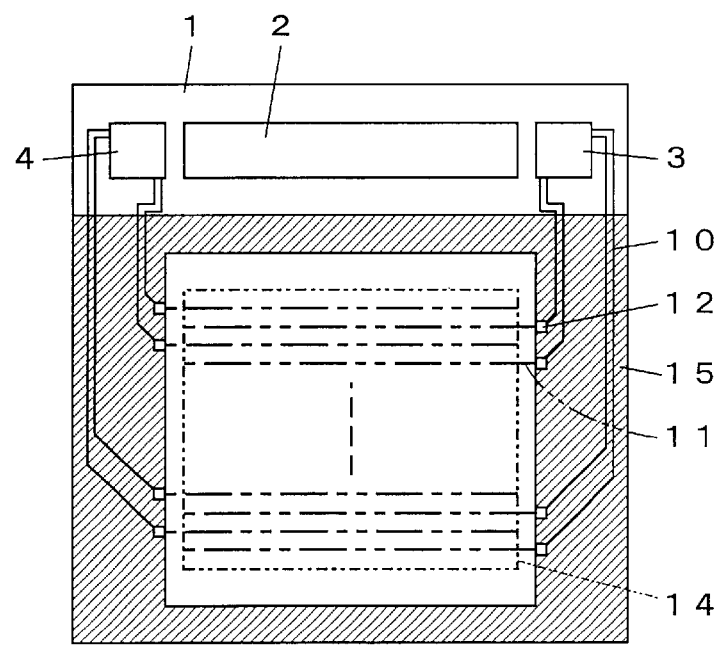
FIG. 16 is a view for explaining an arrangement of the connecting wirings connected to the scanning electrodes in a liquid crystal display device of a fourth modification of the embodiment of the invention.

Fourth Modification: FIG. 16 and FIG. 17

A fourth modification of the above-described embodiment is explained next. FIG. 16 is a view for explaining an arrangement of the connecting wirings connected to the scanning electrodes in a liquid crystal display device of this modification and is a drawing corresponding to FIG. 4 of the embodiment. FIG. 17 is a view showing another example thereof. In these drawings, the same members as those explained in the embodiment are assigned the same numerals.

In this modification, as shown in FIG. 16, the connecting wirings 10 drawn from the scanning electrode driving ICs 3 and 4 pass through the inside of the sealing portion 15 and extend to the connecting regions 12, and are electrically connected to the scanning electrodes 11 on the lower substrate 5 through the sealing portion 15 at the connecting regions 12.

This arrangement enables the region in the sealing portion 15, which is not utilized in the above-described embodiment, to be utilized as the region for arrangement of the connecting wirings 10, so that the external shape of the liquid crystal display device can be slightly reduced as compared to that of the embodiment. Further, since the connecting wirings 10 never oppose the scanning electrodes 11 with the liquid crystal layer 20 sandwiched therebetween in this configuration, it is unnecessary to devise means for shielding or making it difficult to view the ON display at the opposing portion.

Incidentally, in the case of a large number of pixels, the required connecting wirings 10 increases in number accordingly. Thus, it is sometimes difficult to arrange all of the connecting wirings 10 in the region in the sealing portion 15. In such a case, as shown in FIG. 17, it is preferable to install a part of the connecting wirings 10 through the inner side of the sealing portion 15, that is, between the sealing portion 15 and the image display portion 14, and to install the others through the inside of the sealing portion 15. In such a case, it is preferable to provide, at the portion where the connecting wirings 10 run between the sealing portion 15 and the image display portion 14, means for making it difficult to view the ON display at the opposing portion of the connecting wiring 10 and the scanning electrode 11 as described in the embodiment and the first to third modifications.

Such a configuration can also realize a liquid crystal display device which is small and reliable and has a low cost and an excellent display quality.

Other Modifications

The above-described embodiment and modifications show examples in each of which the signal electrodes and the connecting wirings are arranged on the substrate provided with the electrode driving ICs and the connecting wirings are connected to the scanning electrodes. The same effect can be obtained also in a case in which the scanning electrodes and the connecting wirings are arranged on the substrate provided with the electrode driving ICs and the connecting wirings are connected to the signal electrodes.

In the case of a liquid crystal display device having an image display portion elongated in the horizontal direction and so on, it is possible to obtain the above-described effect on the reduction in size of the external shape of glass and in cost even by arranging a plurality of signal electrode driving ICs between two scanning electrode driving ICs. In addition, the effect is the same also in the case of three or more scanning electrode driving ICs and in the case of using a method (called TAB, TCP, COF or the like) of mounting the electrode driving ICs on the FPC.

Although the explanation has been made on the example in which the oscillation power supply method and the APT are used in combination for driving the electrode, it is effective in reducing the cost to separate the scanning electrode driving IC from the signal electrode driving IC if the driving voltage of the signal electrode driving IC is lower than that of the scanning electrode driving IC. Therefore, the same effect can be obtained even in the case, for example, using a driving method (called MLA: Multi-line Addressing, MRA: Multi-row Addressing, MLS: Multi-line selection, and so on) of selecting a plurality of scanning electrodes at one selection timing in an STN liquid crystal display device.

When four scanning electrodes are simultaneously selected by this driving method, the voltage necessary for the scanning electrode driving IC is half (the voltage in the case of the oscillation power supply or the voltage of an IAPT (Improved Alt and Pleshko technique)) that required for the APT under optimal bias conditions, and thus the necessary voltage for about 100 digits is naturally about 15 V. On the other hand, a maximum voltage necessary for the signal electrode driving IC is twice that of the APT, naturally about 6 V, and thus it can also be driven by a low voltage. Therefore, in this case, the use of the configuration in which the scanning electrode driving IC is separated from the signal electrode driving IC as described above also enables reduction in cost of the electrode driving ICs.

Even in a liquid crystal display device in which each pixel is provided with a nonlinear resistance element such as an MIM (Metal-Insulator-Metal) element or the like, a pulse at a high voltage is added to the scanning electrode to turn on the nonlinear element. Meanwhile, the voltage applied to the signal electrode is about 6 V. Therefore, it also becomes possible to reduce the cost of the electrode driving ICs in this case.

Furthermore, the explanation has been made, in the above-described embodiment and modifications, on the example in which the signal electrode driving IC has a memory, a control function, and various power supplies. It is also adoptable, however, to mount a signal electrode driving IC having only a signal electrode driving function and two scanning electrode driving ICs side by side on a liquid crystal panel, and to arrange, in an external circuit, a memory, a graphic controller having a display control function, and various power supply circuits for controlling power supplies. In this case, the cost of the signal electrode driving IC can be made extremely low, and the signal electrode driving IC can be made smaller (short sides can be reduced), which also produces an effect of reduction in substrate size.

As has been described, in the liquid crystal display device of this invention, the scanning electrodes or the signal electrodes are connected to the connecting wirings at the sealing portion, which makes it possible to reduce the wiring region and to increase the image display portion in area. Further, the connecting wirings are provided between the image display portion and the sealing portion on the substrate formed with the signal electrodes, so that it is possible to reduce the space necessary for the wirings, and thereby reducing also the size of the substrate.

Furthermore, the connecting wirings are provided on the inner side of the sealing portion, so that when a plurality of liquid crystal display devices are cut out from large substrates, an effect because of generation of fragments, breakage, or the like in cutting is not caused in the connecting regions, thereby realizing reliable liquid crystal display devices.

Moreover, the shielding is provided between the image display portion and the sealing portion, so that undesired ON display in this region can be shielded to prevent deterioration in display quality as a whole, resulting in improved display quality.

What is claimed is:

1. A liquid crystal display device having a liquid crystal layer sandwiched between a pair of substrates each provided with electrodes and an electrode driving IC, mounted only at one side of either one of said pair of substrates, for driving said respective electrodes on said pair of substrates, comprising:

a sealing portion for bonding said pair of substrates together; and connecting wirings for connecting said electrode driving IC and said electrodes on other substrate, wherein said connecting wirings are arranged between an image display portion provided on an inner side of said sealing portion and said sealing portion, wherein said connecting wirings and said electrodes on said other substrate are electrically connected to each other in connecting regions provided at said sealing portion, and wherein a shielding is provided between said image display portion and said sealing portion.

2. A liquid crystal display device of reflection-type, having a liquid crystal layer sandwiched between a pair of substrates each provided with electrodes, an electrode driving IC, mounted only at one side of either one of said pair of substrates, for driving said respective electrodes on said pair of substrates, and a reflection layer, comprising:

a sealing portion for bonding said pair of substrates together; and connecting wirings for connecting said electrode driving IC and said electrodes on other substrate, wherein said connecting wirings are arranged between an image display portion provided on an inner side of said sealing portion and said sealing portion, wherein said connecting wirings and said electrodes on said other substrate are electrically connected to each other at connecting regions provided in said sealing portion, and wherein said reflection layer is provided in a region other than a region between said image display portion and said sealing portion.

3. A liquid crystal display device having a liquid crystal layer sandwiched between a pair of substrates each provided with electrodes, and an electrode driving IC, mounted only at one side of either one of said pair of substrates, for driving said respective electrodes on said pair of substrates, comprising:

a sealing portion for bonding said pair of substrates together; and connecting wirings for connecting said electrode driving IC and said electrodes on other substrate, wherein said connecting wirings are arranged in said sealing portion, and wherein said connecting wirings and said electrodes on said other substrate are electrically connected to each other at connecting regions provided in said sealing portion.

4. The liquid crystal display device according to claim 1,
wherein instead of providing said shielding,
said electrode on said other substrate is formed to be thinner at a portion where said connecting wiring opposes said electrode, except said connecting region, than in said image display portion.

5. The liquid crystal display device according to claim 1, wherein said shielding is made of a low-reflection metal.

6. The liquid crystal display device according to claim 1, wherein said shielding is made of a black resin.

7. The liquid crystal display device according to claim 1, wherein said shielding is a member formed by printing.

8. The liquid crystal display device according to claim 1, further comprising:
a polarizer to perform a display using a polarization property of said polarizer,
wherein instead of providing said shielding,
said polarizer is provided in a region other than a region between said image display portion and said sealing portion.

9. The liquid crystal display device according to claim 1,
wherein instead of providing said shielding,
said connecting wiring is provided with a low-reflection chrome layer.

10. The liquid crystal display device according to claim 1,
wherein an external shape of said sealing portion matches an external shape of each side of said pair of substrates except the side where said electrode driving IC is provided.

11. The liquid crystal display device according to claim 1,
wherein said respective electrodes on said pair of substrates are signal electrodes and scanning electrodes, and
wherein said electrode driving IC comprises at least one signal electrode driving IC for driving said signal electrodes and at least one scanning electrode driving IC for driving said scanning electrodes.

12. The liquid crystal display device according to claim 11,
wherein said scanning electrode driving IC comprises a plurality of scanning electrode driving ICs which are arranged in a manner to put said signal electrode driving IC therebetween.

13. The liquid crystal display device according to claim 11,
wherein said scanning electrode driving IC is an IC driven by an oscillation power supply having a period in which a potential thereof changes with time.

14. The liquid crystal display device according to claim 12,
wherein said plurality of scanning electrode driving ICs are consistad of two scanning electrode driving ICs, and
wherein scanning electrodes connected to one of said scanning electrode driving ICs and scanning electrodes connected to other scanning electrode driving IC are alternately arranged.

* * * * *